United States Patent [19]

Yoshimi et al.

[11] Patent Number: 4,628,586

[45] Date of Patent: Dec. 16, 1986

[54] TOOL CLAMPING DEVICE FOR MAIN SPINDLE

[75] Inventors: Takani Yoshimi, Gamagouri; Ryoichi Michisita, Okazaki; Hitoshi Sasaki, Kariya, all of Japan

[73] Assignee: Toyoda Koki Kabushiki Kaisha, Kariya, Japan

[21] Appl. No.: 751,559

[22] Filed: Jul. 3, 1985

[30] Foreign Application Priority Data

Jul. 6, 1984 [JP] Japan .................. 59-139164

[51] Int. Cl.$^4$ .................. B23C 5/26; B23Q 3/157
[52] U.S. Cl. .................. 29/568; 409/233
[58] Field of Search .......... 409/231, 232, 233, 234; 408/238, 239 R, 239 A; 29/568, 274

[56] References Cited

U.S. PATENT DOCUMENTS

| | | | |
|---|---|---|---|
| 3,684,303 | 8/1972 | Serra | 279/82 |
| 3,762,271 | 10/1973 | Poincenot | 409/233 |
| 3,875,848 | 4/1975 | Powell | 409/233 |
| 4,068,559 | 1/1978 | Schmid, Jr. et al. | 409/233 |
| 4,075,927 | 2/1978 | Frazier | 409/233 |
| 4,122,755 | 10/1978 | Johnson et al. | 408/238 X |
| 4,352,612 | 10/1982 | Benatti | 409/233 |

FOREIGN PATENT DOCUMENTS 55-15942  4/1980  Japan .
1456611  11/1976  United Kingdom .
2076711  12/1981  United Kingdom .......... 409/233

Primary Examiner—Gil Weidenfeld
Assistant Examiner—Glenn L. Webb
Attorney, Agent, or Firm—Oblon, Fisher, Spivak, McClelland & Maier

[57] ABSTRACT

A tool clamping device for clamping a tool on a main spindle or releasing the same from the main spindle, which includes: a main spindle rotatably supported on a headstock; a push rod extended through the spindle hole of the main spindle so as to be axially slidable, urged rearward by a weak spring and capable of being moved axially for fixing a tool to or releasing the same from the main spindle; a clamping spring for pressing the push rod rearward; a sleeve disposed contiguously with one end of the clamping spring so as to be movable relatively to the push rod; a first interlocking mechanism formed between the push rod and the sleeve so as to interlock the sleeve with the push rod when the sleeve moves in a direction to allow the expansion of the clamping spring and to release the sleeve from the push rod when the sleeve moves in a direction to compress the clamping spring; a second interlocking mechanism capable of being disengaged by the movement of the push rod in a direction to compress the clamping spring; and an unclamping cylinder disposed contiguously with the sleeve to move the sleeve against the resilient force of the clamping spring.

7 Claims, 3 Drawing Figures

TOOL CLAMPING DEVICE FOR MAIN SPINDLE

BACKGROUND OF THE INVENTION

1. Field of the Invention

The present invention relates to a tool clamping device for holding a tool at one end of a main spindle rotatably supported on a headstock.

2. Description of the Prior Art

A tool clamping device of the prior art for clamping a tool on a main spindle is disclosed in Japanese Utility Model Publication No. 55-15942. This known tool clamping device has a drawbar inserted into the spindle hole of a tubular main spindle so as to be slidable along the longitudinal axis of the main spindle, and a holder provided at one end of the drawbar and radially movably holding a plurality of rigid balls. A clamping spring is always seated on a spring seat fixed to the drawbar so as to push the drawbar in a tool clamping direction. An unclamping cylinder for moving the drawbar in a tool releasing direction is provided at the other end of the main spindle.

In this tool clamping device, since the spring seat on which the clamping spring is seated is fixed to the drawbar, the clamping spring is compressed as the drawbar is retracted. Accordingly, in removing a tool from the main spindle, the unclamping cylinder is actuated for releasing the tool to push the drawbar in the tool releasing direction so that the tool is unclamped, after the tool has been gripped by a tool changing arm. Then the tool changing arm is advanced to remove the tool from the main spindle. If the tool is unclamped before the tool changing arm grips the tool, the tool falls off of itself from the nose of the main spindle.

In order to mount a tool on the main spindle, the unclamping cylinder is actuated so as to retract the drawbar after the tool has been inserted into the main spindle by the tool changing arm. After the tool has thus been clamped, the tool changing arm releases the tool. That is, the tool is unclamped after the same has been gripped by the tool changing arm and the tool is clamped after the same has been inserted into the main spindle by the tool changing arm. Accordingly, this known tool clamping device requires a long time period for automatic tool changing operation and the tool changing arm cannot be operated at a high speed.

SUMMARY OF THE INVENTION

It is an object of the present invention to provide a tool clamping device capable of unclamping a tool before a tool changing arm grips the tool fixedly held on the spindle nose without allowing the tool to fall off of itself and releasing the tool immediately after the tool has been inserted into a main spindle by the tool changing arm.

To put it briefly, a tool clamping device of the present invention has a push rod extended so as to be axially slidably through the spindle hole of a main spindle rotatably supported on a headstock, urged rearward by a small resilient force and adapted to be moved axially for clamping or unclamping a tool at the nose of the main spindle. A clamping spring is provided to press the push rod rearward. A sleeve is provided at one end of the clamping spring so as to be movable relatively to the push rod. An interlocking means is formed between the sleeve and the push rod. The interlocking means engages the push rod when it is moved in a direction allowing the expansion of a spring disposed behind the sleeve and disengages from the push rod when it is moved in a direction to compress the spring. Accordingly, the push rod is held at a tool holding position even if the spring is compressed, and the tool is removed from the main spindle only by the action of the tool changing arm.

This constitution according to the present invention holds the push rod at a tool holding position by a weak spring even after a force urging the push rod in a direction to clamp the tool is removed from the push rod through the operation of an unclamping cylinder before the tool is gripped by a gripping arm, and hence the tool is prevented from falling off from the main spindle. Accordingly, the tool unclamping operation need not be interlocked with the operation of the tool changing arm, and thereby the tool changing time can be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
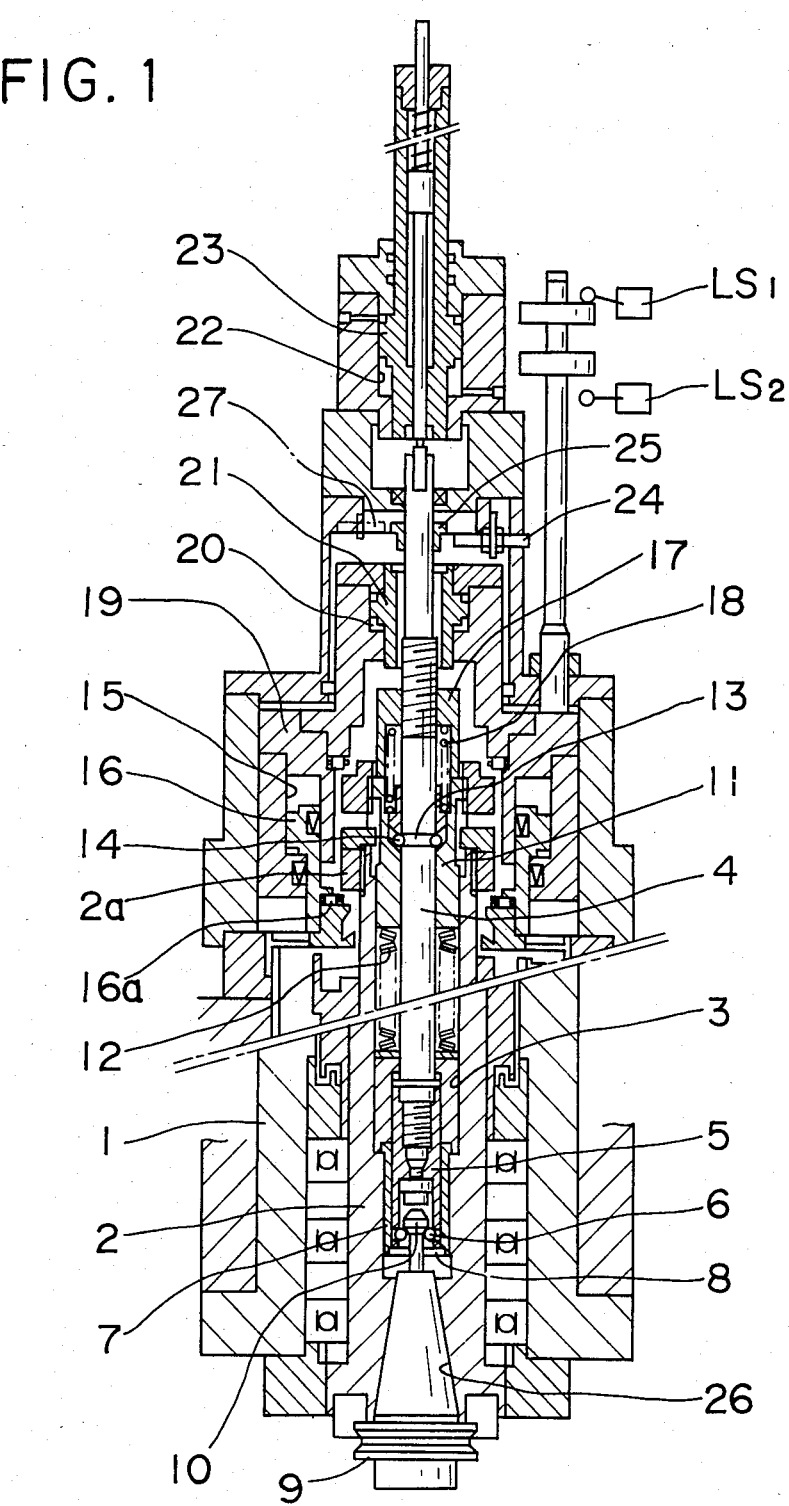
FIG. 1 is a sectional view showing a tool clamping device according to the present invention, in a tool clamping position.

Referring to FIG. 1, indicated at 1 is a headstock and at 2 is a main spindle rotatably supported by bearings on the headstock 1. A push rod 4 is extended through the spindle hole 3 of the main spindle 2 so as to be slidable along the longitudinal axis of the main spindle 2. A holder 5 retaining a plurality of balls 6 so as to be radially movable is screwed on one extremity (lower end as viewed in FIG. 1) of the push rod 4. A sleeve 7 is fixed in the spindle hole 3 and receives the holder 5 slidably. The free end (lower end as viewed in FIG. 1) of the sleeve 7 has a tapered portion 8 which allows the radially outward movement of the balls 6. A tool holder 9 is inserted into a taper hole 26 formed in the free end of the main spindle 2. A pull stud 10 projects from the rear end of the tool holder 9. While engaging the inner surface of the sleeve 7, the balls 6 retained by the holder 5 grip the pull stud 10. When the balls 6 are allowed to move radially outward by the tapered portion 8, the pull stud 10 is allowed to move between the balls 6.

A sleeve 11 is axially slidably fitted in the spindle hole 3 of the main spindle 2 and axially slidably receives the push rod therethrough. An interlocking means is formed between the sleeve 11 and the push rod 4. The interlocking means includes balls 14 interposed between the inner surface of the sleeve 11 and the outer surface of the push rod 4 and an annular groove formed in the outer circumference of the push rod 4 so as to receive the balls 14 therein. A clamping spring 12, such as disk springs, continuously pushes the push rod 4 resiliently through the sleeve 11 in a direction for fixing the tool holder 9, namely, upward as viewed in FIG. 1. When the sleeve is moved in a direction to compress the spring 12 and disengaged from the interlocking means, the sleeve 11 moves relatively to the push rod 4 and the push rod remains as it is.

A spring seat 17 is screwed on the push rod 4 at a position behind the sleeve 11. A push rod retaining spring 18 is interposed between the sleeve 11 and the spring seat 17. This push rod retaining spring 18 prevents the tool holder 9 from moving in a direction to release a tool and falling off from the main spindle of itself when the clamping spring 12 is compressed by a tool unclamping cylinder 15 to remove a pressure urging the push rod 4 in a direction to fix the tool. Accordingly, the push rod retaining spring is capable of applying a resilient force sufficiently large to prevent the tool holder 9 falling off by itself from the main spindle to the push rod 4.

The tool unclamping cylinder 15 is formed in a cylinder block 19 provided axially slidably within the headstock 1. A piston 16 is fitted in the cylinder 15. When fluid pressure is supplied to a chamber in front of the piston 16 (lower chamber as viewed in FIG. 1), the cylinder block 19 is advanced (is moved downward as viewed in FIG. 1) to push the sleeve 11 frontward so that the clamping spring 12 is compressed, and thereby the tool holder 9 is unclamped. In this state, the piston 16 moves backward as far as a stopping member 16a incorporated into the piston 16 is brought into contact with a flange 2a formed at the rear end of the main spindle 2. Therefore a thrust force for unclamping a tool does not work on bearings supporting the main spindle 2.

A push rod pushing cylinder 20 is formed in the cylinder block 19 coaxially with the push rod 4. A piston 21, which is caused to push the push rod 4 in a direction to release a tool, is axially slidably fitted in the push rod pushing cylinder 20. In the unclamping mode, in which the clamping spring 12 is compressed, the cylinder 20 is actuated to push the push rod 4 to release the tool holder 9 tightly fitted in the taper hole 26 of the main spindle 2 from the main spindle 2. The piston 21 is retracted immediately after the tight engagement of the tool holder 9 and the taper hole 26 is loosened.

Figure 3:
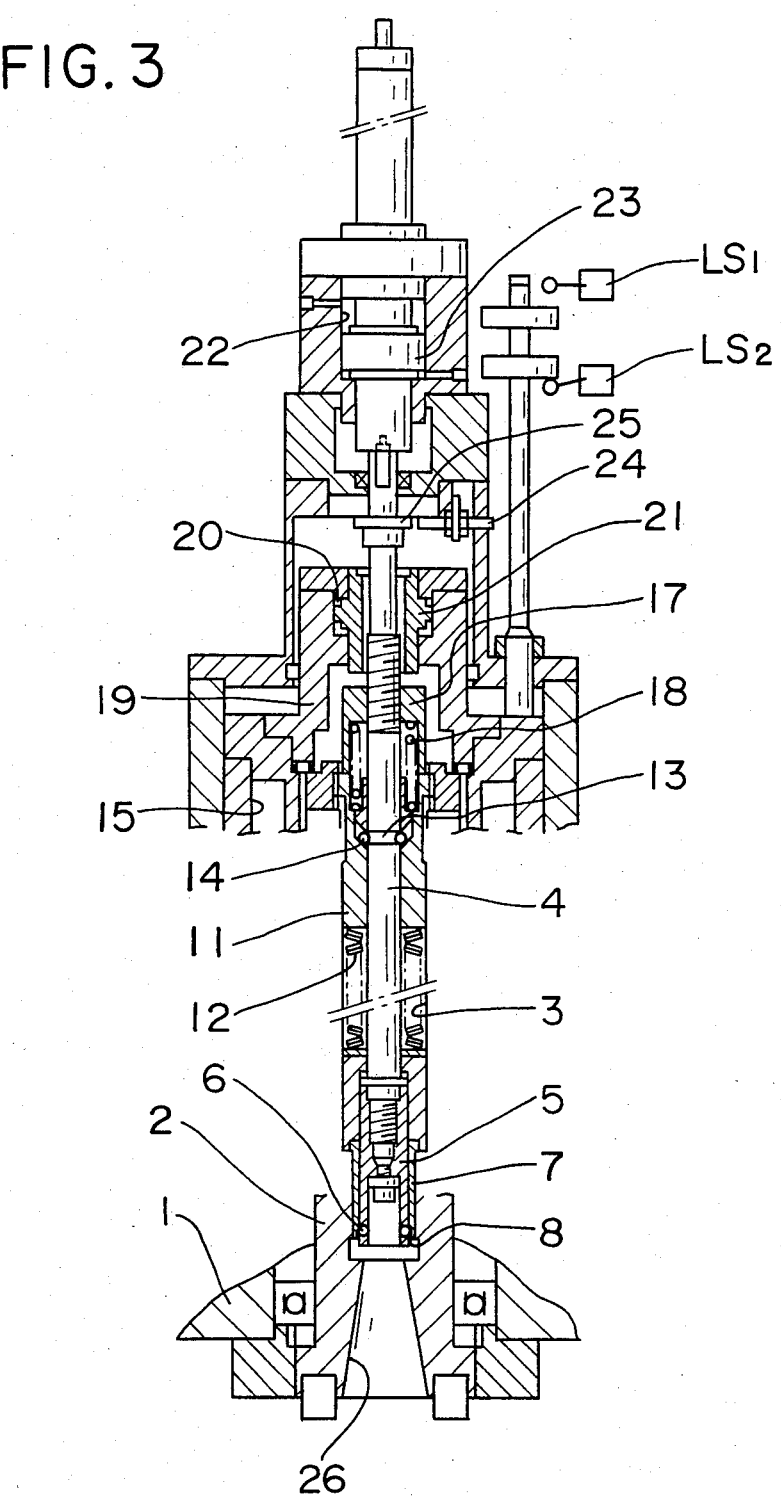
FIG. 3 is a sectional view of the essential portion of the tool clamping device of FIG. 1, in a tool releasing position.

A push rod control cylinder 22 is provided at the rear end (upper end as viewed in FIG. 1) of the headstock 1. A piston 23 fitted in the push rod control cylinder 22, which is brought into contact with the rear end of the push rod 4 to push the push rod 4 in a direction to release the tool. The push rod control cylinder 22 is actuated so as to advance the push rod 4 while the tool holder 9 is unclamped and the tool holder 9 is removed from the main spindle 2 by a tool changing arm. As shown in FIG. 3, when the push rod 4 is advanced, the balls 6 of the holder 5 are moved to a position corresponding to the tapered portion 8, where the balls 6 are allowed to move radially outward so that the pull stud 10 of the tool holder 9 is allowed to slip out of the holder 5. When the push rod 4 is moved to a front limit, the balls 14 fall into the annular groove 13 to interlock the sleeve 11 and the push rod 4 again to maintain the tool releasing state. The piston 23 is retracted immediately after the push rod 4 has been advanced.

A contactless switch 24 is provided to detect the advancement of the push rod 4. When the push rod is advanced, a dog 25 fixed to the push rod 4 throws the contactless switch 24 to an ON-position so that a signal indicating the normal movement of the push rod 4 is provided. A contactless switch 27 is provided for detecting the retraction of the push rod 4. A limit switch $LS_1$ for detecting the completion of the clamping operation and a limit switch $LS_2$ for detecting the completion of the unclamping operation are provided.

The manner of operation of the tool clamping device of the present invention will be described hereinafter. In the condition shown in FIG. 1, the tool holder 9 is fixedly fitted in the taper hole 26. The tool holder 9 is released from the taper hole 26 before a tool changing arm grips the tool holder 9 to remove the same from the main spindle 2.

Figure 2:
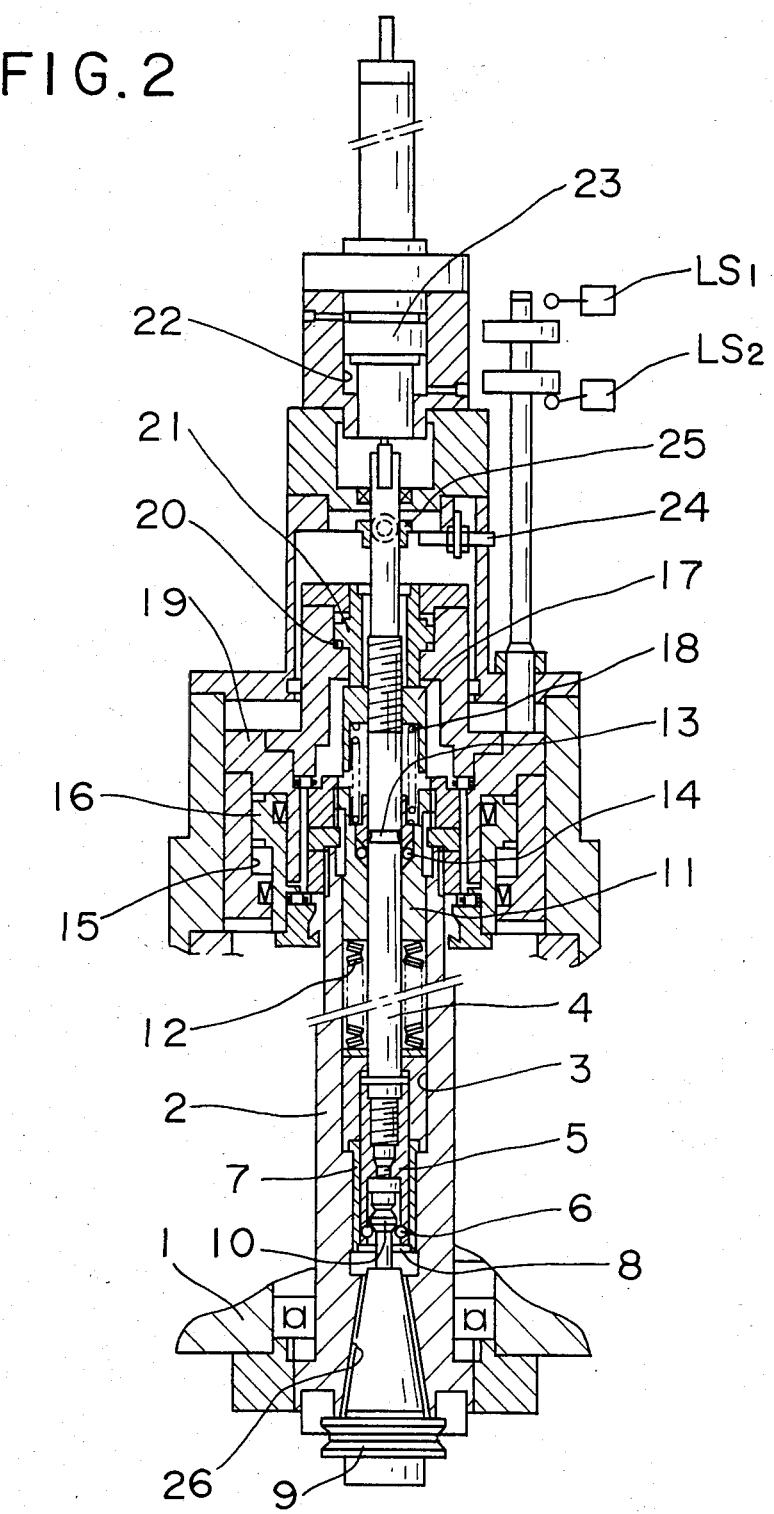
FIG. 2 is a sectional view of the essential portion of the tool clamping device of FIG. 1, in a tool unclamping position.

As shown in FIG. 2, first the unclamping cylinder 15 is actuated to advance the sleeve 11 so that the clamping spring 12 compressed, and thereby the balls 14 are released from the annular groove 13 to release the push rod 4 from the pressure of the clamping spring 12 urging the push rod 4 in a direction to fix a tool in position. Even when the push rod 4 is released from the pressure of the clamping spring 12, the push rod 4 is resiliently retained by the push rod retaining spring 18, therefore, the push rod 4 is unable to move by itself in a direction to release a tool, and hence the tool holder 9 is prevented from falling off from the main spindle 2.

Simultaneously with the actuation of the unclamping cylinder 15, the push rod pushing cylinder 20 is actuated to advance the push rod 4 slightly in order to release the tool holder 9 from the taper hole 26. Upon the detection of the release of the tool holder 9 from the taper hole 26 by the limit switch $LS_2$, the piston 21 of the push rod pushing cylinder 20 is retracted to enable the push rod retaining spring 18 to make the tool holder 9 be seat lightly seated in the taper hole 26 so that the tool holder 9 will not strike against and damage the surface of the taper hole 26 when it is gripped by the tool changing arm.

After the releasing of the tool holder 9 from the taper hole 26 has been confirmed, the tool changing arm grips the tool holder 9 and advances axially of the main spindle 2 to draw out the tool holder 9. When the tool holder 9 is drawn out, the pull stud 10 drags the push rod 4, and thereby the balls 6 of the holder 5 are moved to a position corresponding to the tapered portion 8, when the balls are allowed to move radially outward. Consequently, the pull stud 10 is allowed to slip out from the holder 5. Simultaneously with the extraction of the tool holder 9, the push rod control cylinder 22 is actuated to advance the push rod 4 in order to enable the balls 6 to move radially outward. Furthermore, the balls 14 fall into the annular groove 13 to interlock the push rod 4 with the sleeve 11. Consequently, the rearward movement of the push rod 4 is restricted by the push rod retaining spring 18 to maintain the tool unclamping state. Then, the piston 23 of the push rod control cylinder 22 is retracted to prepare for receiving another tool holder 9 in the main spindle 2.

In this state, the tool changing arm inserts another tool holder 9 into the taper hole 26 of the main spindle 2. Then, the pull stud 10 of the tool holder 9 passes between the balls 6 of the holder 5 and comes into contact with the free end of the push rod 4 to push the push rod 4 rearward. As the push rod 4 moves relatively to the sleeve 11, the balls 14 come out of the annular groove 13 and, finally, the push rod 4 is retained at the rear limit position by the push rod retaining spring 18. At the same time, the balls 6 of the holder 5 are moved radially inward by the inner surface of the sleeve 7 and engage the pull stud 10. In this state, the push rod 4 will not be pulled under the influence of the weight of the tool holder 9. As the tool holder 9 is inserted into the main spindle 2 by the tool changing arm, the push rod 4 is moved rearward. The rearward movement of the push rod 4 is detected by the contactless switch 27. Then, the contactless switch 27 provides a signal to cause the tool changing arm to release the tool holder 9. Then, the unclamping cylinder 15 is actuated to make the clamping spring 12 move the sleeve 11 rearward by its resilient force. Upon the entrance of the balls 14 into the annular groove 14, the pressure of the clamping spring 12 acts on the push rod 4, so that the tool holder 9 engages the taper hole 26 firmly.

Obviously, numerous modifications and variations of the present invention are possible in light of the above teachings. It is therefore to be understod that within the scope of the appended claims, the invention may be practiced otherwise than as specifically described herein.

What is claimed as new and desired to be secured by letters patent of the United States is.

1. A tool clamping device for clamping a tool on a main spindle or releasing the same from the main spindle, comprising: a main spindle rotatably supported on a headstock; a push rod extended through the spindle hole of the main spindle so as to be axially slidable, a weak spring for urging such push rod rearward wherein said push rod is movable axially for fixing a tool to or releasing the same from the main spindle; a clamping spring for pressing the push rod rearward; a sleeve disposed contiguously with one end of the clamping spring so as to be movable relatively to the push rod; first interlocking means formed between the push rod and the sleeve so as to interlock the sleeve with the push rod when the sleeve moves in a direction to allow the expansion of the clamping spring and to release the sleeve from the push rod when the sleeve moves in a direction to compress the clamping spring; second interlocking means capable of being disengaged by the movement of the push rod in a direction to compress the clamping spring; a tool changing arm; and an unclamping cylinder disposed contiguously with the sleeve to move the sleeve against the resilient force of the clamping spring wherein the resilient force of the weak spring urging the push rod rearward is greater than a force that tends to cause the tool to fall off by itself from the main spindle and smaller than the tool pulling force of the tool changing arm and wherein the first interlocking means formed between the sleeve and the push rod further comprises an annular groove formed on a circumference of the push rod, a plurality of balls positioned in said annular groove, and a pressing member for pressing the balls resiliently against the engaging surface of the sleeve, the push rod being retained at a front limit position upon positioning of said balls in said annular groove, after said tool has been removed.

2. A tool clamping device according to claim 1, wherein the unclamping cylinder further comprises pressing means for moving the push rod a short distance in a direction to release the tool so that the tight junction of the tool and the main spindle is loosened, under a condition in which sleeve is pressed to compress the clamping spring.

3. A tool clamping device for clamping a tool on, and releasing it from, a main spindle moving an axial hole and rotatably carried in a headstock, comprising:

a push rod extending through said axial hole of said main spindle and axially movable between a tool clamping position and a tool unclamping position;

a sleeve provided coaxially of, and axially movably relative to, said main spindle and said push rod;

abutting means provided on said push rod and engageable with said sleeve;

a first spring interposed between said main spindle and said sleeve for urging said sleeve and said abutting means engaged therewith in a first direction as to move said push rod to said tool clamping position;

an unclamping actuator for moving said sleeve in a second direction opposite said first direction so as to disengage said sleeve from said abutting means on said push rod;

a second spring for urging said push rod in said first direction so as to hold said push rod at said tool clamping position when said sleeve is disengaged from said abutting means upon actuation of said unclamping actuator and for permitting said push rod to move together with said tool in said second direction when a force is applied to said tool to remove the same from said main spindle; and interlocking means for holding said push rod at said tool unclamping position against said second spring after said tool is removed from said main spindle and for permitting said push rod to move in said first direction when said push rod is pushed in said first direction by said tool which is inserted into said main spindle.

4. A tool clamping device as set forth in claim 3, further comprising:

a loosening actuator engageable with said abutting means for moving said push rod together with said abutting means from said tool clamping position to an intermediate position defined between said tool clamping and unclamping positions, so as to release said tool from a tight connection with said main spindle after said sleeve is disengaged from said abutting means by the actuation of said unclamping actuator, said loosening actuator being adapted to reversely operate immediately after said push rod reaches said intermediate position for permitting said push rod to return to said tool clamping position so that said tool is brought into contact with said tool spindle.

5. A tool clamping device as set forth in claim 4, wherein said unclamping actuator comprises:

a first hydraulic cylinder device having a cylinder body and a piston which are respectively engageable with said sleeve and said main spindle for moving said sleeve relative to said main spindle in such a direction as to come close to each other; and wherein said loosening actuator comprises a second hydraulic cylinder device having a cylinder body secured to said cylinder body of said first hydraulic cylinder device and a piston engageable with said push rod through said abutting means.

6. A tool clamping device as set forth in claim 3, wherein said interlocking means comprises cylindrical chamber means defined by an external surface of said push rod and an internal surface of said sleeve and bearing one end of said second spring;

a plurality of balls positioned in said cylindrical chamber means;

an annular groove formed on said external surface of said push rod for retaining said balls therein; and a tapered surface formed at one axial end of said internal surface of said sleeve for urging said balls to be retained in said annular groove when said sleeve is brought into engagement with said abutting means.

7. A tool clamping device as set forth in claim 6, further comprising:

an auxiliary actuator operable to engage with said push rod prior to insertion of said tool into said main spindle for preventing said push rod held by said balls at said tool unclamping position from being returned by said second spring to said tool clamping position, wherein said auxiliary actuator is reversely actuated for permitting said push rod to return to said tool clamping position when said tool is inserted into said main spindle.

* * * * *